July 19, 1966 C. A. AMANN ETAL 3,261,177
DIRIGIBLE AIR BEARING TRANSPORT DEVICE
Filed Aug. 23, 1965 3 Sheets-Sheet 1

INVENTOR.
Charles C. Amann,
John S. Collman &
BY Jerold W. Scheel

J.C. Evans
ATTORNEY

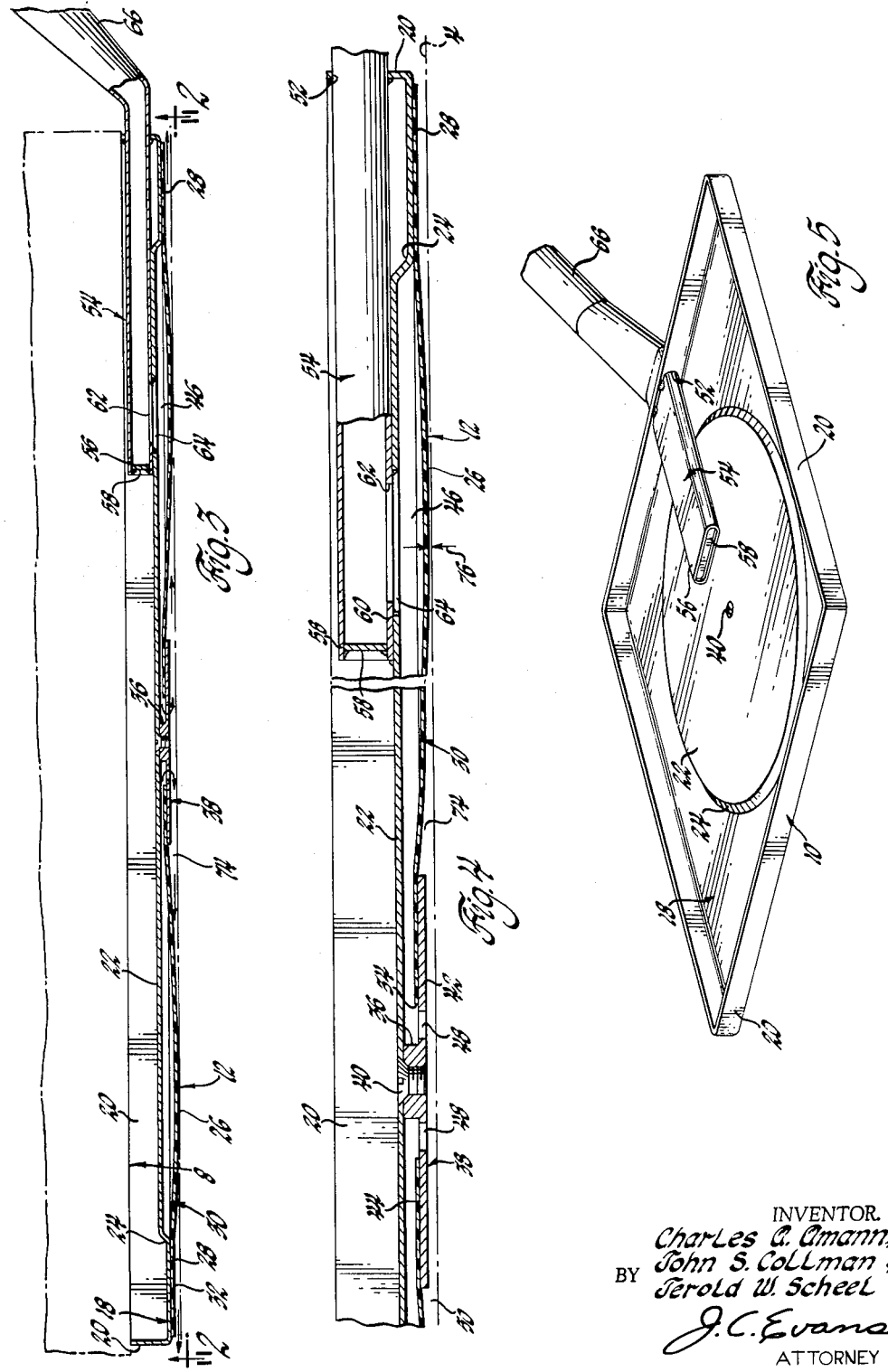

July 19, 1966 C. A. AMANN ETAL 3,261,177

DIRIGIBLE AIR BEARING TRANSPORT DEVICE

Filed Aug. 23, 1965 3 Sheets-Sheet 3

INVENTORS
CHARLES A. AMANN
JOHN S. COLLMAN
JEROLD W. SCHEEL

BY J.C. Evans

ATTORNEY

United States Patent Office 3,261,177
Patented July 19, 1966

3,261,177
DIRIGIBLE AIR BEARING TRANSPORT DEVICE
Charles A. Amann, Bloomfield Hills, and John S. Collman, Orchard Lake, Mich., and Jerold W. Scheel, Santa Barbara, Calif., assignors to General Motors Corporation, Detroit, Mich., a corporation of Delaware
Filed Aug. 23, 1965, Ser. No. 481,875
5 Claims. (Cl. 62—297)

This is a continuation-in-part of United States patent application Serial No. 188,179, filed April 17, 1962.

This invention relates to major domestic appliances normally operative in a continuously stationary position and to a mobile suspension system for such appliances including low-pressure air bearing means capable of supporting the appliance in frictionless spaced relation proximate to a supporting surface.

The invention is concerned primarily, although not exclusively, with providing an efficient, economical and simply operated means for accomplishing easy mobility of bulky household appliances and the like. For purposes of definition, the device hereinafter described is termed an "air caster" in view of its similarity to the function of conventional casters, and to distinguish over various other forms of ground effect machines.

In general, home appliances, such as ranges, refrigerators, freezer cabinets, etc., while capable of movement from installed positions, are in fact rarely moved therefrom due to relatively great physical effort required. As a result, certain portions of such appliances and the adjacent household area are for practical purposes inaccessible for routine cleaning.

The aforementioned domestic appliances are generally referred to as being major domestic appliances as opposed to minor appliances such as vacuum cleaners, clothes ironers, electric frying pans and the like. Such major domestic appliances in addition to requiring great physical effort in order to move them from an installed position are additionally characterized as being located in a continuously stationary position during their normal cycle of operation.

The weight and bulk of major appliances additionally often causes the depending floor engaging legs on the appliances to become set into the surface of the floor whereby such appliances in certain cases are in effect stuck to the floor. In such cases, to move the appliance in addition to overcoming the weight of the appliance, it has been necessary to exert great force to dislodge the appliance.

Furthermore, the weight of the appliance is such that the depending legs when moved over the floor can badly mar the surface covering on the floor. Even when casters or rollers are used, the unit loadings on the floor can cause undesirable indentations in the floor covering.

An object of the present invention, therefore, is to improve the mobility of major appliances of the type having a substantial weight and a thin shell form outer cabinet that encloses a volume devoted substantially completely to carrying out a functional purpose in the appliance wherein only a limited space is provided for the working components of the appliance by the provision of a base support system on the appliance including fixed ground engaging legs and a low-profile, low-pressure air cushion device located below the base of the appliance and operative to exert a lifting force on a base framework of the appliance sufficient to raise the legs, runners or the like on the appliance out of engagement with the floor whereby the appliance is readily movable as a unit for cleaning, maintenance, movement to and from a storage area or the like.

A further object of the present invention is to improve the mobility of a major appliance having a sheet form outer cabinet including a limited space between the working components of the appliance and a supporting surface by the provision of an air cushion device in combination with the appliance located within a limited space between the base of the appliance and the floor wherein the air cushion device includes a flat plate located in close parallelism with the floor and in engagement with a base framework on the appliance and wherein a flexible diaphragm depends from the flat plate to form in conjunction with the flat plate a pressurizable space having an air flow passage therefrom into the space between the diaphragm and the floor for producing an air cushion capable of lifting ground engaging depending members of the base of the appliance out of engagement with the floor whereby the appliance is readily movable for cleaning therearound, maintenance or movement to and from a storage area or the like.

These and other objects, advantages and features of the invention will become more fully apparent as reference is had to the accompanying specification and drawings wherein:

FIGURE 3 is an enlarged sectional elevational view showing the details of construction of the support and associated air bearing;

FIGURE 4 is a further enlarged and fragmented view similar to FIGURE 3;

FIGURE 5 is a perspective view of the device, further illustrating configuration details of the rigid platform portion thereof;

Figure 1:
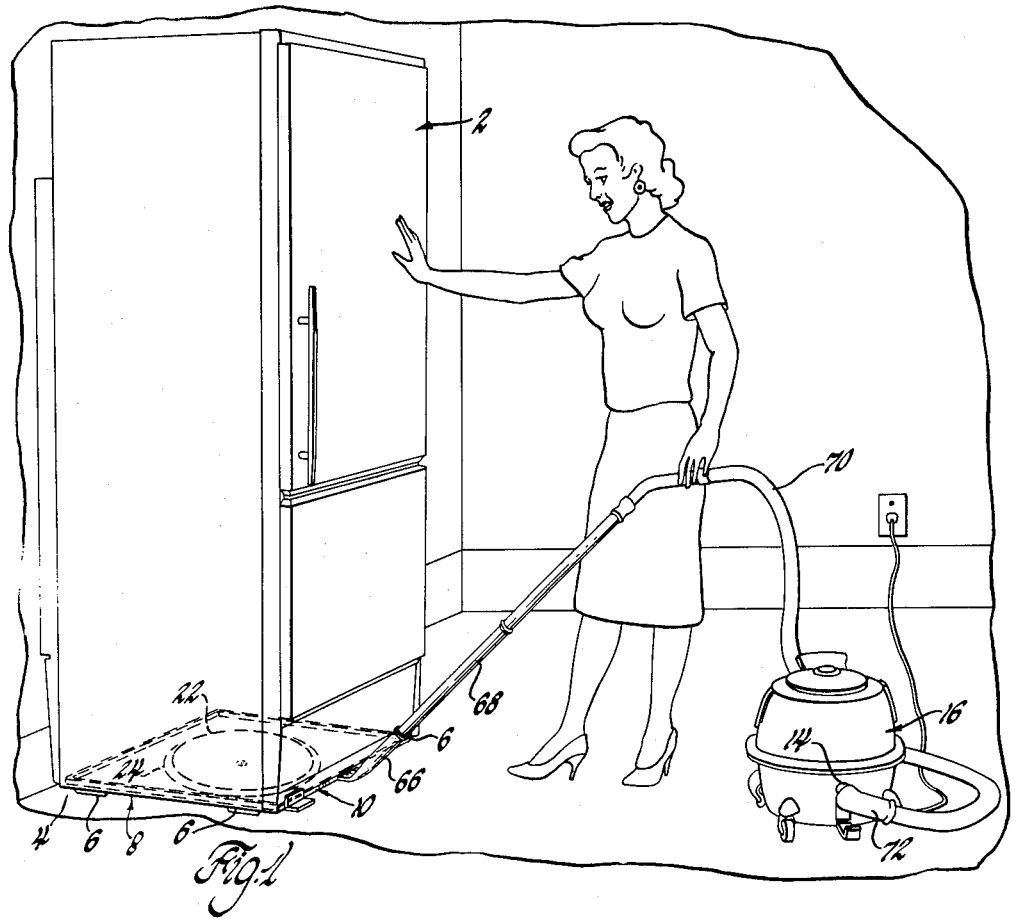
FIGURE 1 is a perspective view showing the invention in relation to a household refrigerator, wherein a conventional cannister type vacuum cleaner forms the source of power therefor.

Referring now to the drawings and particularly FIGURE 1, reference numeral 2 designates a conventional upright horizontal refrigerator-freezer unit. Unit 2 is normally supported above the floor 4 by short legs 6 at the four corners thereof which also serve to provide a clearance or air space between the floor and the lower extremity or surface 8 (FIGURE 3) of the appliance housing or box. According to the present invention, there is provided a shallow tray-like lifting and mobilizing device 10 which is adapted to be slidably inserted beneath the lower surface 8 of the refrigerator and the floor 4. Lifting device 10 includes a flexible plenum chamber type air bearing assembly 12, shortly to be described, which, when energized by connection with the pressure discharge or outlet 14 of a conventional household vacuum cleaner 16, elevates the unit 2 above the floor 4 sufficiently to provide a clearance between legs 6 and the floor 4. Virtually simultaneously, a superatmospheric air "pad" is established between the major portion of the device and the floor, which provides an air bearing operative to eliminate friction with the floor to the extent that the refrigerator may be moved by exerting minor physical effort.

Figure 2:
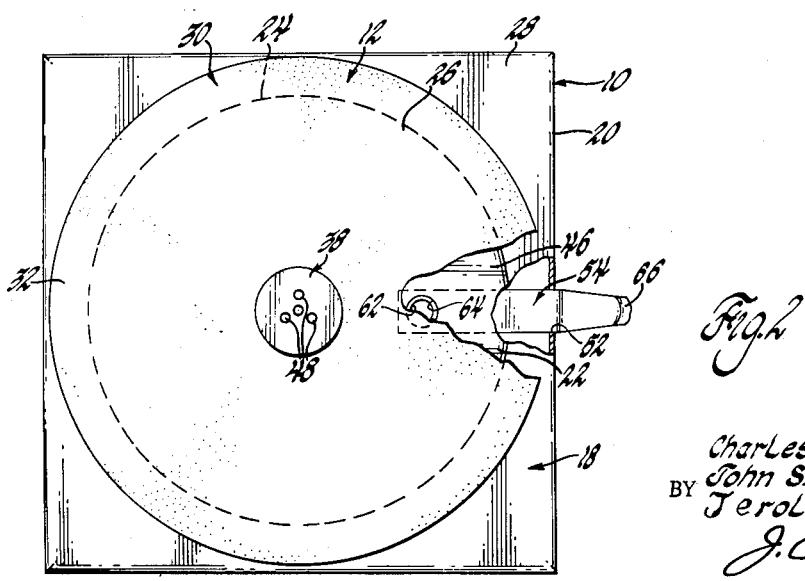
FIGURE 2 is a bottom plan view, partly in section and with parts broken away, illustrating the form and construction of the subject device.

As seen best in FIGURES 2, 3 and 5, lifting device 10 comprises a substantially flat relatively thin platform element 18 having a vertically upturned perimetrical flange 20 and a central upwardly dished circular portion 22. Flange 20 and dished portion 22 serve to impart structural rigidity to platform 10, while the circular portion 22 additionally defines the circular boundary 24 of the area 26 over which air bearing support is effected. As seen best in FIGURES 2 and 3, the lower surface 28 of platform 18 has disposed thereover a circular sheet or diaphragm 30 of flexible material, such as a commercial Vinyl film, the diameter of which is approximately equal to the transverse or longitudinal dimension of platform 18. According to the invention, that portion 32 of the flexible material between the outer periphery thereof and the circular boundary 24 of area 26 is bonded or otherwise secured to the lower surface 28 of platform 18, as for example by epoxy cement. Centrally thereof, diaphragm 30 is formed with an aperture 34 through which extends the stud portion 36 of a circular plate-like element 38. Stud portion 36 is rigidly secured to the lower surface and centrally of dished portion 22 by machine screw 40. Stud 36 is dimensioned vertically so that the lower surface 42 of plate 38 is flush with the lower surface of diaphragm 30 in the area where the upper surface of the latter is bonded to lower surface 28 of plate 18. The lower surface of diaphragm 30 adjacent aperture 34 is in turn bonded to the upper surface 44 of plate 38 so that diaphragm 30 and plate 18 form an annular inflatable cavity 46. Immediately radially inwardly of aperture 34 in diaphragm 30, plate 38 is formed with a plurality of vertically directed openings 48 which provide communication between annular cavity 46 and the space 50 between diaphragm 30 and the floor.

Extending through an aperture 52 in flange 20 and rigidly secured thereto, as by welding, is an air inlet duct 54 of generally rectangular cross section. The inner extremity 56 of duct 54 extends inboard of platform 18 into overlying flush engagement with upwardly deformed portion 22 and is capped by an end closure 58. Slightly outboard of closure 58, the lower wall 60 of duct 54 is formed with an aperture 62 which registers with an aperture 64 formed in dished portion 22 so that the interior of the duct is in communication with annular cavity 46. At its outer end, duct 54 sweeps upwardly and outwardly to form an inclined tubular neck portion 66 of circular cross section, the diameter of which permits telescoping rigid engagement with a standard tubular extension "wand" 68 conventionally present at the free end of the length of flexible hose 70 utilized in cannister and tank type vacuum cleaners, such as shown at 16 in FIGURE 1.

In operating the device described, the end 72 of flexible hose 70 is disconnected from the suction connection and reconnected at the pressure or outlet connection 14 of cleaner 16. The tubular wand 68 is then telescopingly inserted into tubular neck 66 of lifting device 10 until rigid engagement is achieved. The operator then manually slides lifting device 10 beneath the refrigerator 2 using wand 68 as a handle. When lift device 10 is in the operating position shown in FIGURE 1, the vacuum cleaner 16 is switched on, causing superatmospheric air to be discharged therefrom and enter hose 70, wand 68 and duct 54, emerging through registered apertures 62 and 64 into cavity 46. Entrance of air in cavity 46 causes diaphragm 30 to bulge downwardly, as shown in FIGURE 3, and exert a lifting force elevating the appliance above the floor. As soon as maximum elevation within the inflation limits of the annular cavity have been achieved, continuing flow of air from vacuum cleaner 16 emerges from cavity 46 through apertures 48 in the plate 38 into the space 50 between diaphragm 30 and the floor 4, establishing a low-pressure "pad" of air in the generally frustoconical plenum cavity 74 formed between diaphragm 30 and floor 4. The effective diameter of the air "pad" is bounded by an imaginary circle defined by the lowermost extremity of downwardly bulged diaphragm 30, which extremity forms a throttling gap 76 limiting the rate of radial discharge of air from the cavity 74. In practice, it has been found that the indicated circular area over which the air bearing "pad" is effective is more than sufficient to elevate and support a typical household refrigerator when operating from discharge pressures well within the normal operational capability of any of a variety of well known household vacuum cleaners. While the area may obviously be increased by forming the diaphragm as a square sheet and cementing it along the straight side of platform 10, the circular configuration is desirable, since it eliminates unsymmetrical inflation stresses on the diaphragm which may, therefore, be cut from ordinary flat stock.

In appliances such as upright refrigerators having relatively small base area in relation to total bulk, stability when supported by air bearing means is of paramount importance. It will be evident that if the appliance exhibits a tendency to tilt or rock, one or more of legs 6 will ground out. In addition, such inclination, if significant, could spoil the air bearing effect. However, a device constructed in accordance with the present invention not only tolerates an extraordinary degree of tilting, but more importantly the rigid connection between the vacuum cleaner tubular extension 68 and platform 10 allows manual control of any tilting tendency, either fore and aft or laterally, by providing a substantial lever arm enabling application of manual pressure to either resist or correct inclination of the supported load. In practice, it has been found that such appliances are easily stabilized during movement by exerting manual pressure on the upper end of the tubular extension with one hand, while exerting a counteracting manual pressure directly against an upper corner portion of the appliance with the other hand.

Figure 6:
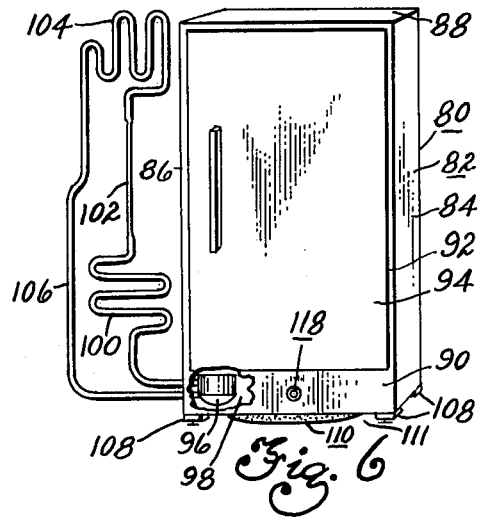
FIGURE 6 is a view in front elevation of a refrigerator including another embodiment of the present invention.

In the embodiment of the invention shown in FIGURE 6 an improved refrigerator assembly 80 is illustrated including a representatively shown vertical type unit having an outer cabinet 82 including side walls 84, 86, a top 88, a rear wall 89 and a front wall 90. In the front wall 90 is an access opening 92 into a food storage compartment that is closed by a vertically hinged door member 94.

The walls of the outer cabinet 82 are formed of a suitable sheet form material that in cooperation with a liner (not shown) forms a space that receives a suitable thermal insulating material for reducing the heat loss from the food storage compartment. The food storage compartment in the illustrated arrangement is cooled by a refrigerant system including a compressor 96 supported in a work space 98 at the base of the refrigerator. The compressor discharges compressed refrigerant into a condenser 100 that is serially connected through an elongated capillary tube 102 for expanding the refrigerant prior to passage through an evaporator coil 104 that is located in heat exchange relationship with the food storage compartment. Refrigerant from the evaporator 104 passes through a suction line 106 back to the compressor 96.

One characteristic of refrigerator assemblies such as that illustrated is that the volume enclosed by the outer shell or cabinet thereof preferably is devoted primarily to compartmented space for use in storing articles at a predetermined reduced temperature. Accordingly, the work space 98 in which the compressor 96 is located has a reduced height and preferably occupies a relatively small amount of the space enclosed by the cabinet 82.

Figure 7:
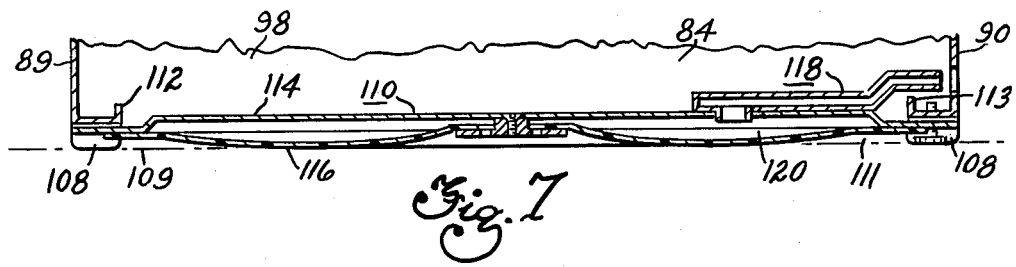
FIGURE 7 is an enlarged fragmentary view in vertical section of the base of the improved refrigerator assembly in a normally stationary position with respect to a supporting surface.
Figure 8:
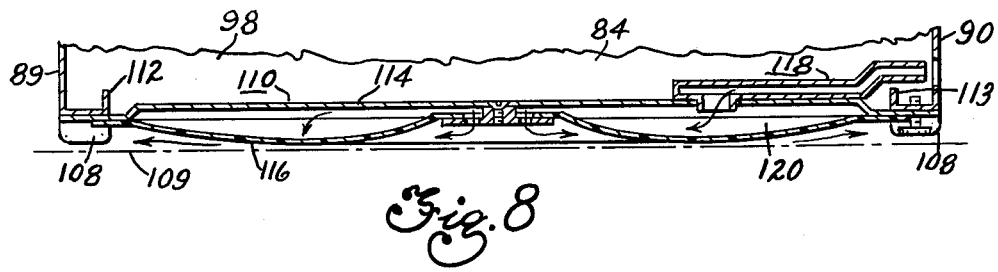
FIGURE 8 is a fragmentary enlarged view of the base of the improved refrigerator assembly raised from a supporting surface by an air cushion.

In the illustrated arrangement, as was the case in the first embodiment, the refrigerator has a plurality of depending members or legs 108 located on the base of the cabinet 82 at each of the corners thereof that engage a surface of a supporting floor shown in FIGURES 7 and 8 at 109. The legs 108, as was the case in the first embodiment, provide a clearance or air space 111 between the floor supporting the refrigerator and the lower extremity of the outer cabinet 82 as best seen in FIGURES 7 and 8.

The usual supporting surface for refrigerators of the type shown in the first embodiment and in the embodiment of FIGURES 6–8 is a linoleum type of covering or an insertable plastic-like material that is relatively smooth. The legs 108 direct a high unit loading against the floor that often causes the floor surface to depress sufficiently to cause the refrigerator legs to become set in the supporting surface. Such refrigerator assemblies can be characterized, therefore, as being normally operative in a substantially continuous stationary position.

In the embodiment of the invention shown in FIGURES 6–8, in addition to the legs 108, the base support system for the refrigerator 80 includes a low-profile air cushion device 110 of the type previously discussed in the embodiment of the invention shown in FIGURES 2–5. The device 110 is located within the limited height confines of the air space 111 in close spaced relationship with the surface 109 of the supporting floor when the refrigerator assembly 80 is supported on the floor by the legs 108. The lifting device 110 is substantially of the form of that shown in the first embodiment and is located below channel-shaped flanges 112, 113 on the lower extremity of the front wall 90 and rear wall 89 of the outer cabinet 82 that reinforce the lower extremities of the thin sheet form outer cabinet 82. The flanges 112, 113 are merely representative of one arrangement for reinforcing the outer cabinet 82 at its lower extremities. The flanges 112, 113 serve to reinforce the outer periphery of a thin platform element 114 like element 18 in the first embodiment without its perimetrical flange 20. Like in the first embodiment the platform element 114 underlies substantially the full planar extent of the base of the refrigerator 80.

The lifting device 110 is otherwise of the same form and configuration of that previously set forth in the first embodiment including a flexible plenum forming member 116 like diaphragm 30 and an air inlet duct 118 like duct 54.

When pressurized air is directed into the duct 118 it passes into a pressurizable chamber 120 between the diaphragm 116 and platform element 114 to cause the diaphragm to bear against the floor 109. As shown in FIGURE 8, this causes the platform element 114 to move upwardly in the space 111 into engagement with the flanges 112, 113. The device 110 then raises the legs 108 from floor 109 and floats the refrigerator 80 on an air cushion as set forth in the first embodiment.

Furthermore, in addition to the aforementioned problems, in modern-day kitchens and like regions of a household often the major appliance is a free standing unit that is located in kitchen cabinet arrangements forming spaces closely matched to the size of the appliances to present a built-in appearance. In such cases, to move the appliances, great care and substantial manual effort must be exerted to avoid damaging the outer cabinet of the appliance or the adjacent kitchen cabinets.

A characteristic of the refrigerators described above and like major appliances is that the cabinets of the appliances are generally formed to utilize the space bounded by the cabinet in an efficient manner. For example, in refrigerators, it is desired to utilize as much of the bounded space as possible for food storage. Likewise in ranges it is desirable to utilize as much of the space as possible for ovens, utility spaces and a surface cooking area including surface heating elements thereon. Similar considerations are present in other major appliances such as clothes washers, dryers, dishwashers, and the like. Accordingly, in these appliances the space reserved for the operative components of the appliances as for example in the case of refrigerators, the machiery compartment that includes the compressor of the refrigerator and the like is generally of a limited nature and located in close spaced relationship with the surface on which the appliance is supported. Hence, in many cases, it has been relatively difficult to utilize well-known devices such as pneumatic lifts and trucks or the like to aid in the manual moving of the appliance.

Hence, typically once appliances have been located in a particular location of a kitchen or other like region of a household, they are more or less permanently located and as a result, there is often a substantial accumulation of dust, kitchen spillage and the like in the space about these appliances. Moreover, in certain appliances the accumulation of dust or the like can adversely affect the operation of the appliance as, for example, in the case of refrigerators, condensers, superheat coils and the like included in the machinery compartment of the appliance can become coated with a layer of material that reduces the heat transfer from such components of the system in a manner to reduce the efficiency of operation thereof. By virtue of the increased mobility of appliances provided by the present invention, these problems are obviated by simplifying routine cleaning. Furthermore, the inventive system materially simplifies servicing the operative components of such appliances by enabling the appliance to be readily moved to positions where such components are accessible.

While the embodiments of the present invention as herein disclosed constitute preferred forms, it is to be understood that other forms might be adopted.

What is claimed is as follows:

1. A refrigerator assembly comprising an outer cabinet forming a food storage compartment and a machinery compartment, said machinery compartment being located at the base of said outer cabinet and including a refrigerant compressor therein, a condenser, an evaporator, means for serially connecting said compressor, condenser and evaporator in serial refrigerant flow relationship for cooling said food storage compartment, air lifting means disposed below said machinery compartment within said outer cabinet, a reinforcing member on the bottom edge of said outer cabinet, said air lifting means inculding a thin paltform element engageable with said reinforcing member on said cabinet, an annular flexible diaphragm connected to the lower surface of said platform element to form an inflatable cavity, means forming an opening in said platform element for directing air interiorly of said cavity, and means formed in said diaphragm for venting said cavity into the space beneath said diaphragm for producing an air lifting force to raise the bottom edge of said outer cabinet away from its supporting surface.

2. A refrigerator assembly comprising an outer cabinet having a lower extremity, said outer cabinet forming a food storage compartment and a machinery compartment, said machinery compartment being bounded by said lower extremity of said outer cabinet, a refrigerant compressor located within said machinery compartment, a condenser, an evaporator located in heat exchange relationship with said food storage compartment, means for serially connecting said compressor, condenser and evaporator in refrigerant flow relationship, a reinforcing member located within said outer cabinet at the lower extremity thereof and secured thereon for reinforcing said outer cabinet, said reinforcing member being located generally below said refrigerant compressor, depending members on said reinforcing member stationarily locating said outer cabinet on a supporting surface, said depending members locating the bottom extremity of said cabinet in close spaced relationship with the supporting surface, air cushion means supported beneath said compressor within said machinery compartment, said air cushion means including a thin plate member underlying said machinery compartment and extending throughout substantially the full planar extent of the base of said outer cabinet, said thin member engaging said reinforcing member, an annular flexible diaphragm bonded at an inner point to said plate member and at its outer periphery to said member to form an annular inflatable cavity, means forming an opening in said member for directing pressurized air interiorly of said annular cavity, means forming a plurality of openings in said diaphragm for venting said annular cavity into the space beneath said diaphragm, said diaphragm being movable upon directing air into said annular cavity to move into engagement with the supporting floor for initially lifting said depending members away from the supporting floor, said flexible diaphragm subsequently being supported out of engagement with the supporting surface by an air cushion for supporting the refrigerator on a frictionless film of air for effortless and quick movement thereof with respect to a supporting surface by the application of a minimal manual force on said outer cabinet.

3. In the combination of claim 2, a duct having one end thereof communicating with the opening in said thin member and the opposite end thereof located closely adjacent the front wall of said outer cabinet, said other end of said duct being adapted to be connected with an exteriorly located air source for supplying pressurized air into said annular cavity.

4. In a major appliance normally continuously supported in a stationary position during operation the combination of, an outer cabinet of sheet form having a base portion, a reinforcing framework on said base portion for reinforcing said cabinet, depending members of said reinforcing framework engageable with a floor for locating said base portion a predetermined distance above the floor, said depending members serving to direct the full weight of the appliance against the floor for stationarily locating said outer cabinet thereon, air lift means located within said outer cabinet beneath said base portion reinforcing framework, said air support means including a rigid member engageable with said framework and a flexible member depending from said rigid member and forming in cooperation therewith a pressurizable chamber, an air inlet in said rigid member for directing pressurized air to said pressurizable chamber, said flexible member forming a generally frusto-conical plenum space when said chamber is pressurized, said flexible member having a parametric surface thereon bounding said plenum chamber, said flexible member having an opening therein for directing air from said pressurizable chamber into said plenum chamber, air in said plenum chamber being discharged beneath said parametric surface portion of said flexible member and thence outwardly of said cabinet to produce an air lifting force on said flexible member, said air lifting force being directed by said rigid member against said framework for raising said outer cabinet upwardly with respect to the supporting surface to move said depending members out of engagement with the supporting surface whereby the outer cabinet is movable relative to the supporting surface without said depending members bearing thereagainst.

5. In a major appliance normally continuously supported in a stationary position during operation the combination of, an outer cabinet of sheet form with lower extremities defining a machinery compartment, a reinforcing framework on said lower cabinet extremities for reinforcing said cabinet, depending members on said reinforcing framework engageable with the supporting surface for locating said lower cabinet extremities a predetermined distance above the supporting surface, said depending members serving to direct the full weight of the appliance against the supporting surface for stationarily locating said cabinet thereon, air lift means located within said outer cabinet at the base thereof beneath said machinery compartment, said air lift means including a platform member engageable with said framework and a flexible member depending from said platform member and forming in cooperation therewith a pressurizable chamber, an air inlet in said platform member for directing pressurized air to said pressurizable chamber, said flexible member forming a generally frusto-conical plenum space when said chamber is pressurized, said flexible member having a parametric surface thereon bounding said plenum chamber, said flexible member having an opening therein for directing air from said pressurizable chamber into said plenum chamber, air in said plenum chamber being discharged beneath said parametric surface portion of said flexible member and thence under said lower cabinet extremities to produce an air lifting force on said flexible member, said air lifting force being directed by said platform member against said framework for raising said outer cabinet upwardly with respect to the supporting surface to move said depending members out of engagement with the supporting surface whereby the outer cabinet is movable relative to the supporting surface without said depending members marring the supporting surface.

References Cited by the Examiner

UNITED STATES PATENTS

| 2,780,826 | 2/1957 | Coons | 180—7 X |
|---|---|---|---|
| 2,918,183 | 12/1959 | Petersen | 180—7 X |
| 3,052,483 | 9/1962 | Petersen | 180—7 X |
| 3,055,446 | 9/1962 | Vaughen | 180—7 |
| 3,094,223 | 6/1963 | Smith | 180—7 X |
| 3,097,718 | 7/1963 | Jay | 180—7 |
| 3,161,247 | 12/1964 | Mackie | 180—7 |
| 3,164,103 | 1/1965 | Lathers | 180—7 X |

WILLIAM J. WYE, *Primary Examiner.*